United States Patent
Wu

(10) Patent No.: US 9,900,803 B2
(45) Date of Patent: Feb. 20, 2018

(54) DEVICE AND METHOD OF HANDLING LONG TERM EVOLUTION-WIRELESS LOCAL AREA NETWORK AGGREGATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 136 days.

(21) Appl. No.: 15/180,081

(22) Filed: Jun. 12, 2016

(65) Prior Publication Data

US 2016/0366612 A1 Dec. 15, 2016

Related U.S. Application Data

(60) Provisional application No. 62/174,542, filed on Jun. 12, 2015, provisional application No. 62/186,340, (Continued)

(51) Int. Cl.
*H04W 28/06* (2009.01)
*H04W 76/02* (2009.01)
(Continued)

(52) U.S. Cl.
CPC ......... *H04W 28/06* (2013.01); *H04W 76/023* (2013.01); *H04W 76/026* (2013.01); *H04W 84/12* (2013.01); *H04W 88/06* (2013.01)

(58) Field of Classification Search
CPC . H04W 28/06; H04W 76/023; H04W 76/025; H04W 76/026; H04W 84/12; H04W 88/06
See application file for complete search history.

(56) References Cited

U.S. PATENT DOCUMENTS

2015/0304921 A1* 10/2015 Hong ............... H04W 36/08
455/436
2016/0323779 A1* 11/2016 Laselva ............. H04W 28/08
(Continued)

FOREIGN PATENT DOCUMENTS

| CN | 102215530 A | 10/2011 |
|---|---|---|
| CN | 104170308 A | 11/2014 |
| EP | 2704481 A1 | 3/2014 |

OTHER PUBLICATIONS

3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
(Continued)

*Primary Examiner* — Mohamed Kamara
(74) *Attorney, Agent, or Firm* — Winston Hsu

(57) ABSTRACT

A communication device comprising of an application side, a long term evolution (LTE) modem and a wireless local area network (WLAN) modem comprises a storage unit for storing instructions and a processing means coupled to the storage unit. The processing means is configured to execute the instructions stored in the storage unit. The instructions comprise connecting to a LTE network using LTE communication and a WLAN using WLAN communication; transmitting first data of an application to the LTE modem from an application side if the WLAN is configured by a base station (BS) of the LTE network for LTE-WLAN aggregation, after connecting to the LTE network and the WLAN; and transmitting second data of the application to the WLAN modem from the application side if the WLAN is not configured by the BS for the LTE-WLAN aggregation, after connecting to the LTE and the WLAN.

18 Claims, 10 Drawing Sheets

Related U.S. Application Data filed on Jun. 29, 2015, provisional application No. 62/186,344, filed on Jun. 29, 2015.

(51) Int. Cl.
*H04W 84/12* (2009.01)
*H04W 88/06* (2009.01)

(56) References Cited

U.S. PATENT DOCUMENTS

| | | | | |
|---|---|---|---|---|
| 2016/0373964 | A1* | 12/2016 | Nagasaka | H04W 28/08 |
| 2017/0034054 | A1* | 2/2017 | Sukumar | H04L 45/66 |
| 2017/0099625 | A1* | 4/2017 | Li | H04W 76/026 |
| 2017/0134261 | A1* | 5/2017 | Seo | H04L 12/66 |
| 2017/0195955 | A1* | 7/2017 | Ryoo | H04W 52/0216 |

OTHER PUBLICATIONS

3GPP TS 36.321 V12.5.0 (Mar. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.323 V12.3.0 (Mar. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
Search Report dated Nov. 7, 2016 for EP application No. 16173893.5, pp. 1~8.
LG Electronics Inc., "Considerations on LTE/WLAN aggregation", 3GPP TSG-RAN WG2 #90, R2-152730, May 25-29, 2015, Fukuoka, Japan, XP050974028, pp. 1-3.
MediaTek Inc., "UP architecture and required functions for LTE/WLA aggregation", 3GPP TSG-RAN2 #89bis Meeting, R2-151358, Apr. 20-24, 2015, Bratislava, Slovakia, XP050936306, pp. 1-4.
Search Report dated Feb. 16, 2017 for EP application No. 16173893.5, pp. 1~13.
LG Electronics Inc., "Considerations on LTE/WLAN aggregation", 3GPP TSG-RAN WG2 #90, R2-152730, May. 25-29, 2015, Fukuoka, Japan, XP050974028, pp. 1-3.
Samsung, Considerations of user preference on LTE-WLAN interworking/aggregation, 3GPP TSG-RAN WG2 Meeting #89bis, Fukuoka, Japan, May 25-29, 2015, R2-152339.
Office action dated Mar. 23, 2017 for the Taiwan application No. 105118360, filed Juun 13, 2016, p. 1-9.

* cited by examiner

DEVICE AND METHOD OF HANDLING LONG TERM EVOLUTION-WIRELESS LOCAL AREA NETWORK AGGREGATION

CROSS REFERENCE TO RELATED APPLICATIONS

This application claims the benefit of U.S. Provisional Applications No. 62/174,542, filed on Jun. 12, 2015, and No. 62/186,340 and No. 62/186,344, filed on Jun. 29, 2015, which are incorporated herein by reference.

BACKGROUND OF THE INVENTION

1. Field of the Invention

The present invention relates to a communication device and a method used in a wireless communication system, and more particularly, to a communication device and method of handling long term evolution-wireless local area network aggregation in a wireless communication system.

2. Description of the Prior Art

Long term evolution (LTE)-wireless local area network (WLAN) aggregation can be used for increasing data rate. A user equipment (UE) is configured to transmit/receive data via both LTE and WLAN according to LTE-WLAN aggregation. However, according to the prior art, the UE transmits/receives data via only the WLAN according to an operating system (OS) of the UE, when the UE connects to both the LTE and the WLAN. In addition, an evolved Node-B (eNB) of the LTE connected by the UE releases a radio resource control (RRC) connection of the UE due to no data communication between the UE and the eNB, because the UE does not transmit any data via the LTE. Accordingly, the UE enters an idle mode. Thus, the LTE-WLAN aggregation cannot work.

In addition, the LTE-WLAN aggregation is only applied to a data radio bearer (DRB) using a radio link control (RLC) acknowledged mode (AM). An evolved packet system (EPS) bearer mapped to the DRB also has quality of service (QoS) configuration. However, the QoS configuration of the EPS bearer and the RLC AM of the DRB may not fit all applications. For example, an application is a web browsing while another application is an IP multimedia subsystem (IMS) voice call. It is proper to transmit/receive the web browsing packets using the EPS bearer, but it is improper to transmit/receive IPS voice packets of the IMS voice call using the EPS bearer, because the RLC AM introduces unnecessary latency for transmission of the IMS voice packets.

Thus, how to perform the LTE-WLAN aggregation is an important problem to be solved. In addition, the unnecessary latency for transmission of the IMS voice packets when the UE is configured with the LTE-WLAN aggregation is also an important problem to be solved.

SUMMARY OF THE INVENTION

The present invention therefore provides a method and related communication device for handling the LTE-WLAN aggregation to solve the abovementioned problem.

A communication device comprising of an application side, a long term evolution (LTE) modem and a wireless local area network (WLAN) modem comprises a storage unit for storing instructions and a processing means coupled to the storage unit. The processing means is configured to execute the instructions stored in the storage unit. The instructions comprise connecting to a LTE network using LTE communication and a WLAN using WLAN communication; transmitting first data of an application to the LTE modem from an application side if the WLAN is configured by a base station (BS) of the LTE network for LTE-WLAN aggregation, after connecting to the LTE network and the WLAN; and transmitting second data of the application to the WLAN modem from the application side if the WLAN is not configured by the BS for the LTE-WLAN aggregation, after connecting to the LTE and the WLAN.

A communication device comprising an application side, a long term evolution (LTE) modem and a wireless local area network (WLAN) modem comprises a storage unit for storing instructions and a processing means coupled to the storage unit. The processing means is configured to execute the instructions stored in the storage unit. The instructions comprise connecting to a LTE network using LTE communication and a WLAN using WLAN communication; not initiating a dynamic host configuration protocol (DHCP) operation for requesting an internet protocol (IP) address, if the WLAN is configured by a base station (BS) for LTE-WLAN aggregation; and initiating the DHCP operation for requesting the IP address, if the WLAN is configured by an operation system (OS).

A communication device of handling long term evolution (LTE)-wireless local area network (WLAN) aggregation comprises a storage unit for storing instructions and a processing means coupled to the storage unit. The processing means is configured to execute the instructions stored in the storage unit. The instructions comprise enabling or disabling support of the LTE-WLAN aggregation by a first function of the communication device; turning on or off a WLAN function by a second function of the communication device; transmitting a LTE protocol data unit (PDU) comprising a first data block of an application via a LTE radio frequency (RF) transceiver to a base station (BS) or transmit a first WLAN MAC PDU (MPDU) comprising the LTE PDU via a first WLAN, if the support of the LTE-WLAN aggregation is enabled by the first function and the WLAN function is turned on or turned off by the second function; and transmitting a second WLAN MPDU comprising a second data block of the application via a second WLAN, if the support of the LTE-WLAN aggregation is disabled by the first function and the WLAN function is turned on by the second function.

A communication device for handling long term evolution (LTE)-wireless local area network (WLAN) aggregation comprises a storage unit for storing instructions and a processing means coupled to the storage unit. The processing means is configured to execute the instructions stored in the storage unit. The instructions comprise connecting to a LTE network using LTE communication and a WLAN using WLAN communication; transmitting a first internet protocol (IP) packet of a first application using a first IP address and a WLAN communication interface via the WLAN, wherein the first IP address is received via the LTE network; and transmitting a second IP packet of a second application using a second IP address and the WLAN communication interface via the WLAN, wherein the second IP address is received via the WLAN and is different from the first IP address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
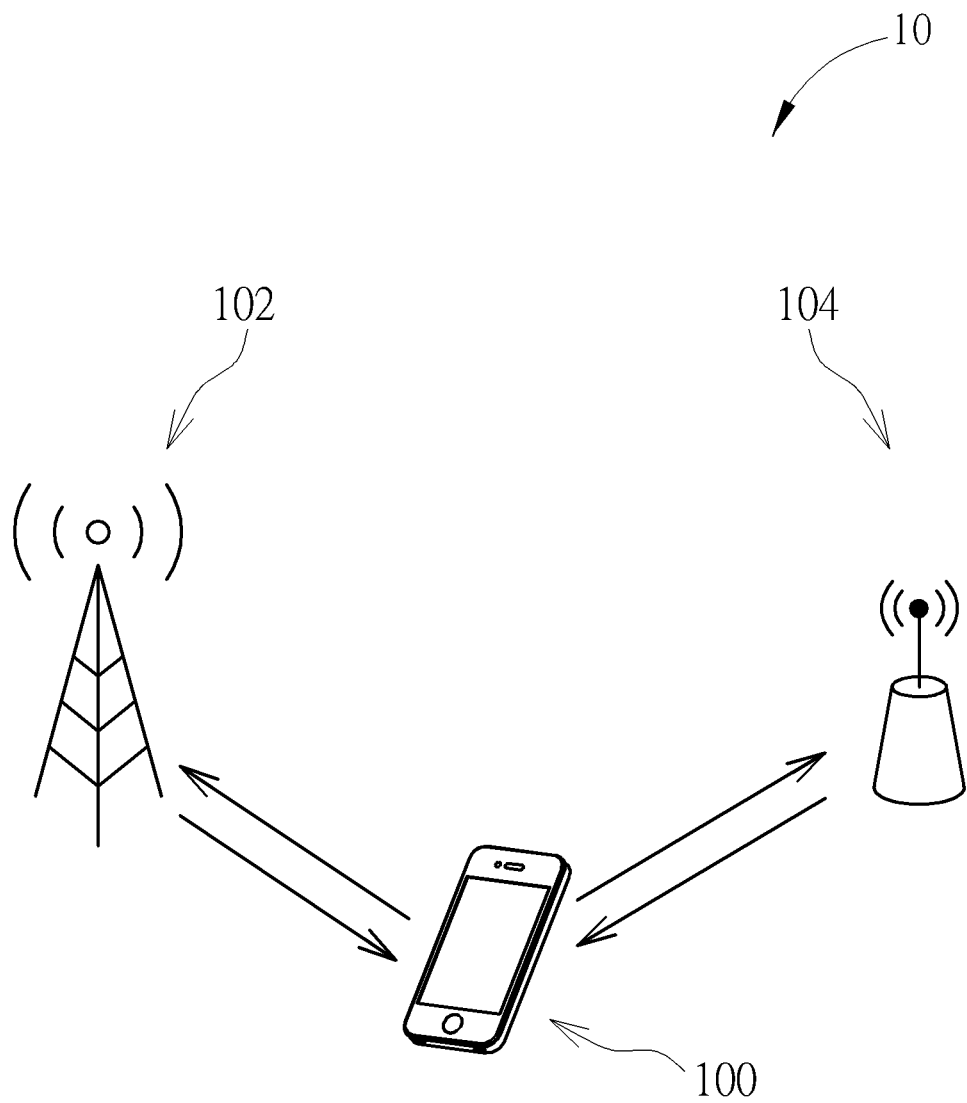
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and an access point (AP) 104. In FIG. 1, the communication device 100, the BS 102 and AP 104 are simply utilized for illustrating the structure of the wireless communication system 10. In one example, the BS 102 may be an evolved Node-B (eNB) in an evolved universal terrestrial radio access network (E-UTRAN) of a long term evolution (LTE) system, or a fifth generation (5G) BS employing orthogonal frequency-division multiplexing (OFDM) and/or non-OFDM for communicating with the communication device 100 in a wider bandwidth (e.g., greater than 20 MHz) or a shorter time interval (e.g., less than 1 ms) of transmission. The AP 104 may be a network entity in a wireless local area network (WLAN). The communication device 100 and the AP 104 may support IEEE 802.11 related standards (e.g., IEEE 802.11a/b/g/n/ac/ad).

In FIG. 1, the communication device 100 is configured to communicate with the BS 102 and the AP 104 at the same time according to LTE-WLAN aggregation or 5G-WLAN aggregation configured to the communication device 100. That is, the communication device 100 performs a transmission/reception to/from the BS 102 and the AP 104 via the LTE/5G and the WLAN. In addition, the communication device 100 communicates with the BS 102 via one or more radio bearer(s) utilizing the LTE or 5G resource(s), and the communication device 100 communicates with the AP 104 via one or more radio bearer(s) utilizing the WLAN resource(s).

The communication device 100 may be a user equipment (UE), a mobile phone, a laptop, a tablet computer, an electronic book, a portable computer system, a vehicle or an aircraft. In addition, for an uplink (UL), the communication device 100 is a transmitter and the BS 102 and AP 104 are receivers, and for a downlink (DL), the BS 102 and AP 104 are transmitters and the communication device 100 is a receiver.

Figure 2:
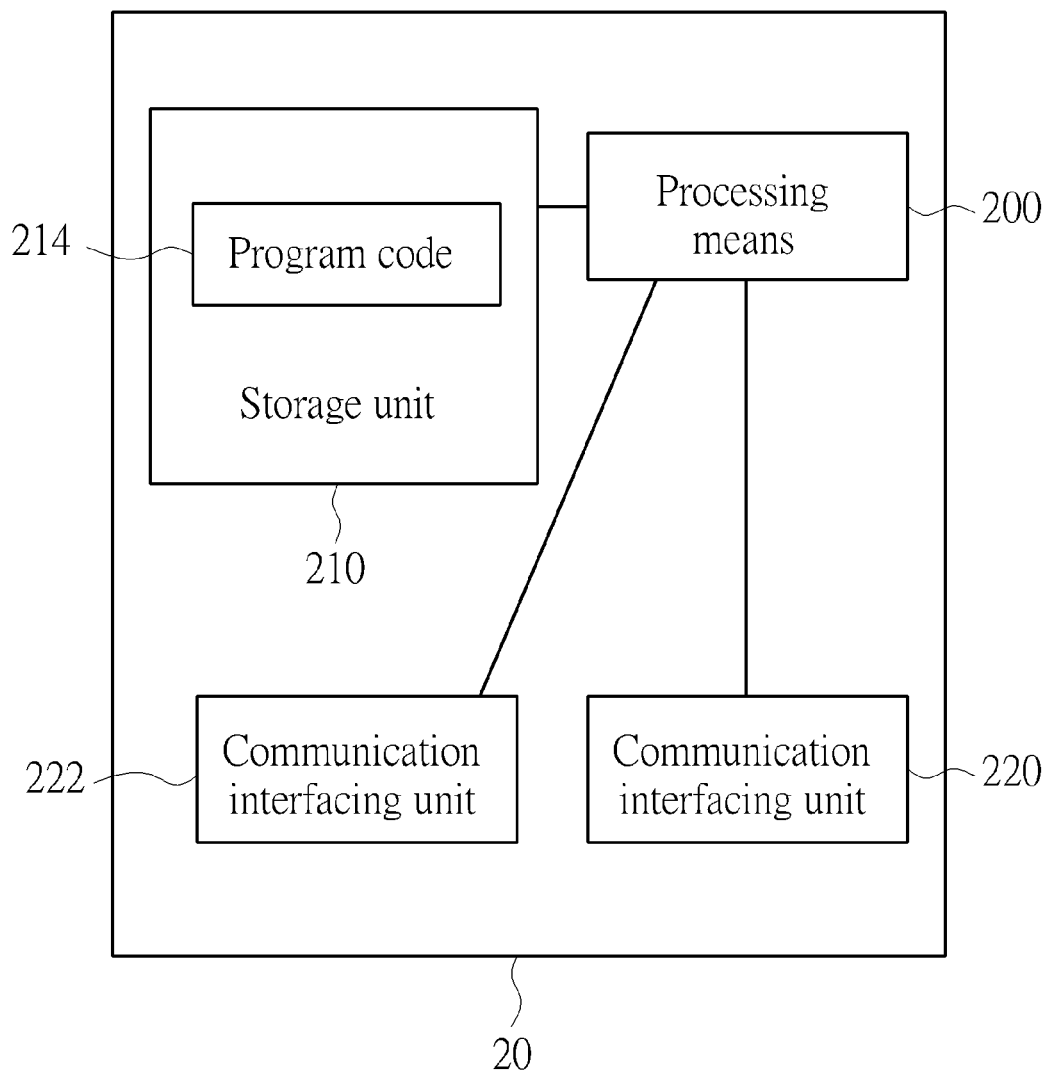
FIG. 2 is a schematic diagram of a communication device according to an example of the present invention.

FIG. 2 is a schematic diagram of a communication device 20 according to an example of the present invention. The communication device 20 may be the communication device 100, the BS 102 or the AP 104 shown in FIG. 1, but is not limited herein. The communication device 20 may include a processing means 200 such as a microprocessor or Application Specific Integrated Circuit (ASIC), a storage unit 210, a communication interfacing unit 220 for LTE/5G transmission/reception, and a communication interfacing unit 222 for WLAN (e.g., WiFi) transmission/reception. The storage unit 210 may be any data storage device that may store a program code 214, accessed and executed by the processing means 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
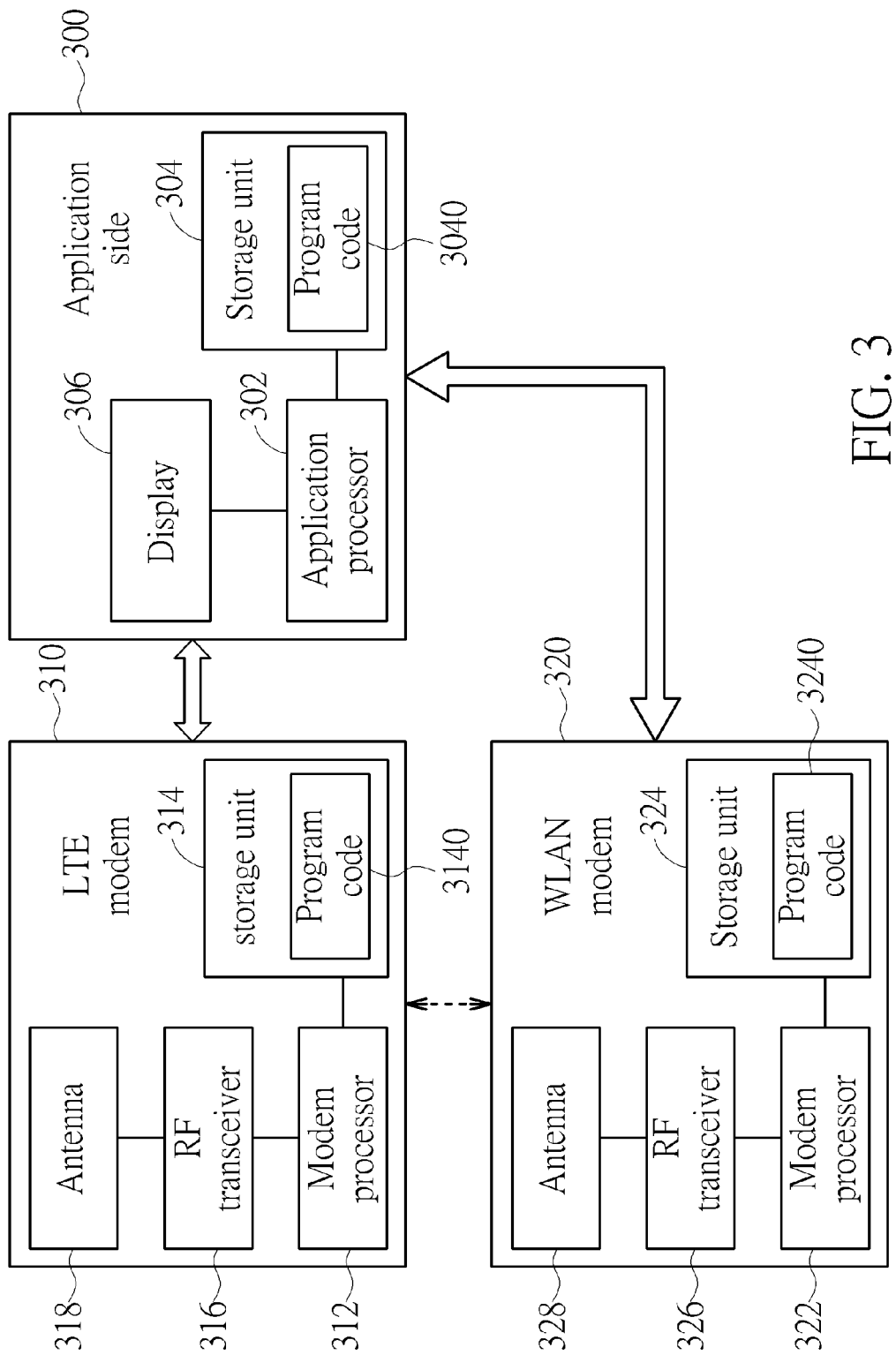
FIG. 3 is a schematic diagram of a communication device according to an example of the present invention.

FIG. 3 is a schematic diagram of a communication device 30 according to an embodiment of the present invention. The communication device 30 may be the communication device 100, the BS 102 or the AP 104 shown in FIG. 1, but is not limited herein. The communication device 30 may include an application side (APS) 300 (e.g., application module), a LTE modem 310 (e.g., modem module) and a WLAN modem 320. In detail, the APS 300 may communication with the LTE modem 310 and the WLAN modem 320, respectively. As shown in FIG. 3, the LTE modem 310 and the WLAN modem 320 may communication with each other directly (e.g., via the dotted line) or indirectly (e.g., via the APS 300). The APS 300 may include an application processor 302, an application storage unit 304, and a display 306. The LTE modem 310 may include a modem processor 312, a modem storage unit 314, a radio frequency (RF) transceiver 316, and an antenna 318. The WLAN modem 320 may include a modem processor 322, a modem storage unit 324, a RF transceiver 326, and an antenna 328. The application processor 302 may run an operating system (OS) (e.g., an Android OS, a Windows phone 7 OS, or an iPhone OS (iOS)) to control the display 306 to display software applications and a user interface (UI). The modem processors 312 and 322 may run communication protocols to support wireless communication technologies of LTE/5G and WLAN, respectively. The application storage unit 304, the modem storage units 314 and 324 may be any data storage device that stores program codes 3040, 3140 and 3240 accessed and executed by the application processor 302, the modem processors 312 and 322, respectively. Examples of the application storage unit 304, the modem storage units 314 and 324 include but are not limited to a ROM, flash memory, RAM, hard disk, optical data storage device, non-volatile storage unit, non-transitory computer-readable medium (e.g., tangible media), cloud storage, etc. The application storage unit 304, the modem storage units 314 and 324 may share a same data storage device, e.g., the same data storage device may have two partitions. The RF transceivers 316 and 326 may be used for communicating with other communication devices wirelessly and may transform processing results from the modem processors 312 and 322 into radio signals. Examples of the display 306 are realized but are not limited to a liquid crystal display (LCD), an e-paper display, a touch control display, or any other suitable display device.

In the following embodiments, a UE is used for representing the communication device 100 in FIG. 1 and a BS is used for representing the BS 102 in FIG. 1 to simplify the illustration of the examples. "LTE" described below can be replaced by "5G".

Figure 4:
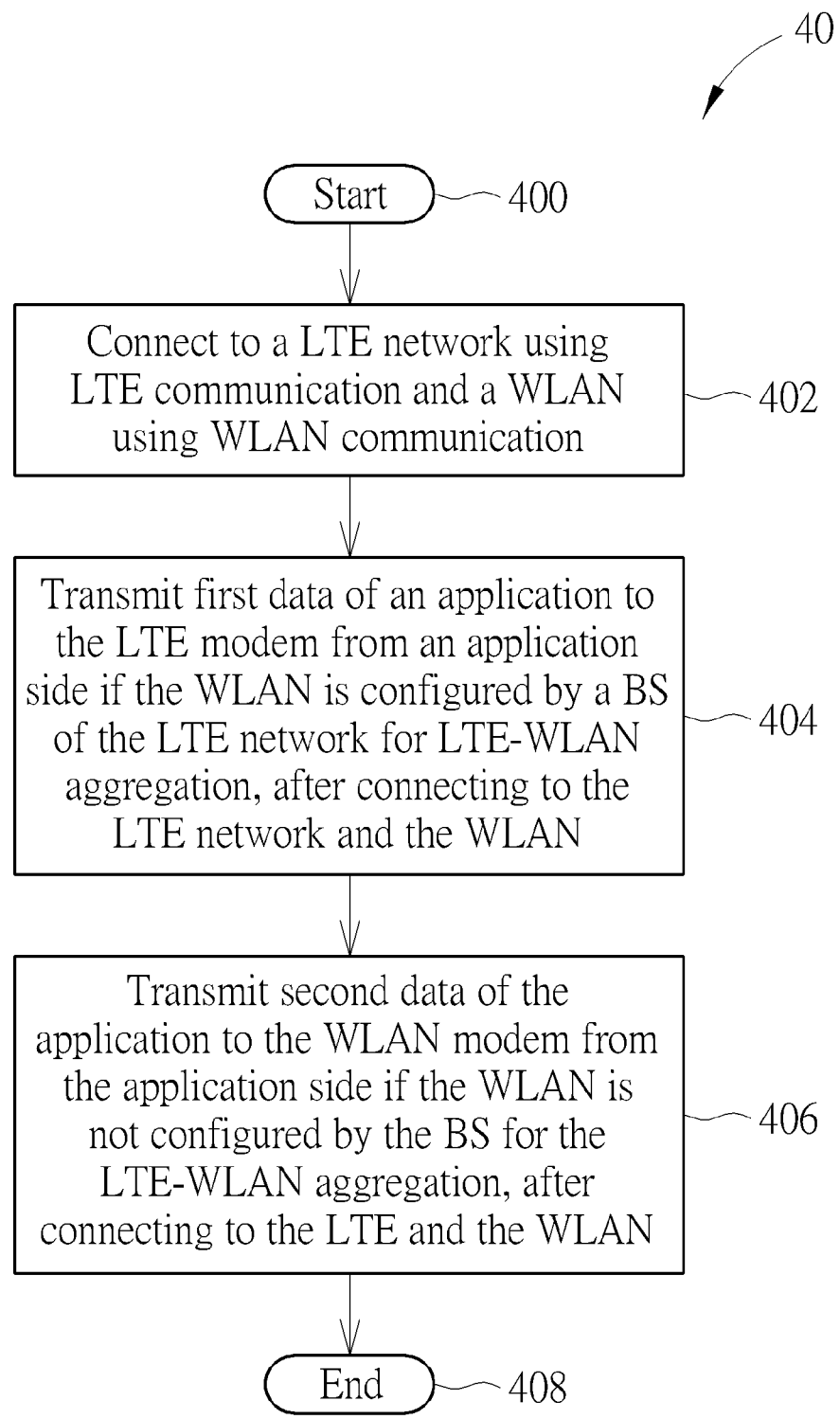
FIG. 4 is a flowchart of a process according to an example of the present invention.

FIG. 4 is a flowchart of a process 40 according to an example of the present invention. The process 40 may be utilized in a UE comprising an application side, a LTE modem and a WLAN modem, to perform LTE-WLAN aggregation. The process 40 includes the following steps:

Step 400: Start.

Step 402: Connect to a LTE network using LTE communication and a WLAN using WLAN communication.

Step 404: Transmit first data of an application to the LTE modem from an application side if the WLAN is configured by a BS of the LTE network for LTE-WLAN aggregation, after connecting to the LTE network and the WLAN.

Step 406: Transmit second data of the application to the WLAN modem from the application side if the WLAN is not configured by the BS for the LTE-WLAN aggregation, after connecting to the LTE and the WLAN.

Step 408: End.

According to the process 40, the UE connects to a LTE network using LTE communication and a WLAN (e.g., WiFi) using WLAN communication. Then, the UE transmits first data of an application (e.g., ftp or http) to the LTE modem from an application side if the WLAN is configured by a BS for LTE-WLAN aggregation, after connecting to the LTE network and the WLAN. Further, the UE transmits second data of the application to the WLAN modem from the application side if the WLAN is not configured by the BS for the LTE-WLAN aggregation, after connecting to the LTE network and the WLAN. That is, the LTE modem transmits the first data via the LTE network using the LTE communication and/or the WLAN using the WLAN communication, to the BS, if the LTE-WLAN aggregation is configured. In other words, the UE does not transmit the data via only the WLAN. Thus, the problem that the LTE-WLAN aggregation dos not work is solved.

Realization of the process 40 is not limited to the above description.

In one example, the WLAN is not configured by the BS for enabling transmission/reception of at least one LTE packets via the WLAN to/from the BS. That is, the WLAN is selected by the UE (e.g. selected by a user or a selection application in an OS), and is not used for the LTE-WLAN aggregation. The LTE packet may be LTE protocol data units (PDUs) or service data units (SDUs)).

In one example, the UE transmits a first message indicating support of the LTE-WLAN aggregation to the BS via the LTE, and may receive a configuration message (e.g., RRCConnectionReconfiguration) configuring transmission and/or reception of at least one LTE packet via (e.g., from) the WLAN and a WLAN configuration, from the BS via LTE communication. Further, the UE may connect to the WLAN configured by the WLAN configuration.

In one example, the WLAN may be selected by the application side (e.g., the application processor), when the WLAN is not configured by the BS for the LTE-WLAN aggregation.

In one example, the first data of the application includes a first plurality of internet protocol (IP) packets, and the UE transmits the first plurality of IP packets to the LTE modem from the application side. Specifically, the UE encapsulates the first plurality of IP packets into a plurality of LTE protocol data units (PDUs) by the LTE modem, and transmits part or all of the first plurality of LTE PDUs to the WLAN modem either indirectly (i.e. via the application side) or directly by the LTE modem. Further, the UE encapsulates the first plurality of LTE PDUs into at least one WLAN media access control (MAC) PDU (MPDU), and transmits the at least one WLAN MPDU to the WLAN by the WLAN modem.

It should be noted that the LTE modem may or may not connect to the WLAN modem. Thus, the LTE modem may transmit part or all of the first plurality of LTE PDUs to the WLAN modem directly or indirectly via the application side.

In one example, the second data of the application includes a second plurality of IP packets, and the UE transmits the second plurality of IP packets to the WLAN modem from the application side. Further, the UE encapsulates the second plurality of IP packets into at least one WLAN MPDU, and transmits the at least one WLAN MPDU to the WLAN by the WLAN modem.

In one example, the UE receives a first IP address from the LTE network and a second IP address via the WLAN. In one example, a source IP address in each of the first plurality of IP packets is set to the first IP address. In one example, a source IP address in each of the second plurality of IP packets is set to the second IP address. In one example, the first IP address is configured by the LTE network in an ACTIVATE DEFAULT EPS BEARER CONTEXT REQUEST message. The second IP address is configured by the WLAN in a dynamic host configuration protocol (DHCP) protocol. In general, the first IP address and the second IP address may be different. The UE determines to use the first IP address for transmitting some or all of the first plurality of IP packets to the WLAN, if the LTE-WLAN aggregation is configured by the BS. The UE determines to use the second IP address for transmitting the second plurality of IP packets to the WLAN, if the WLAN is configured by the OS.

Figure 5:
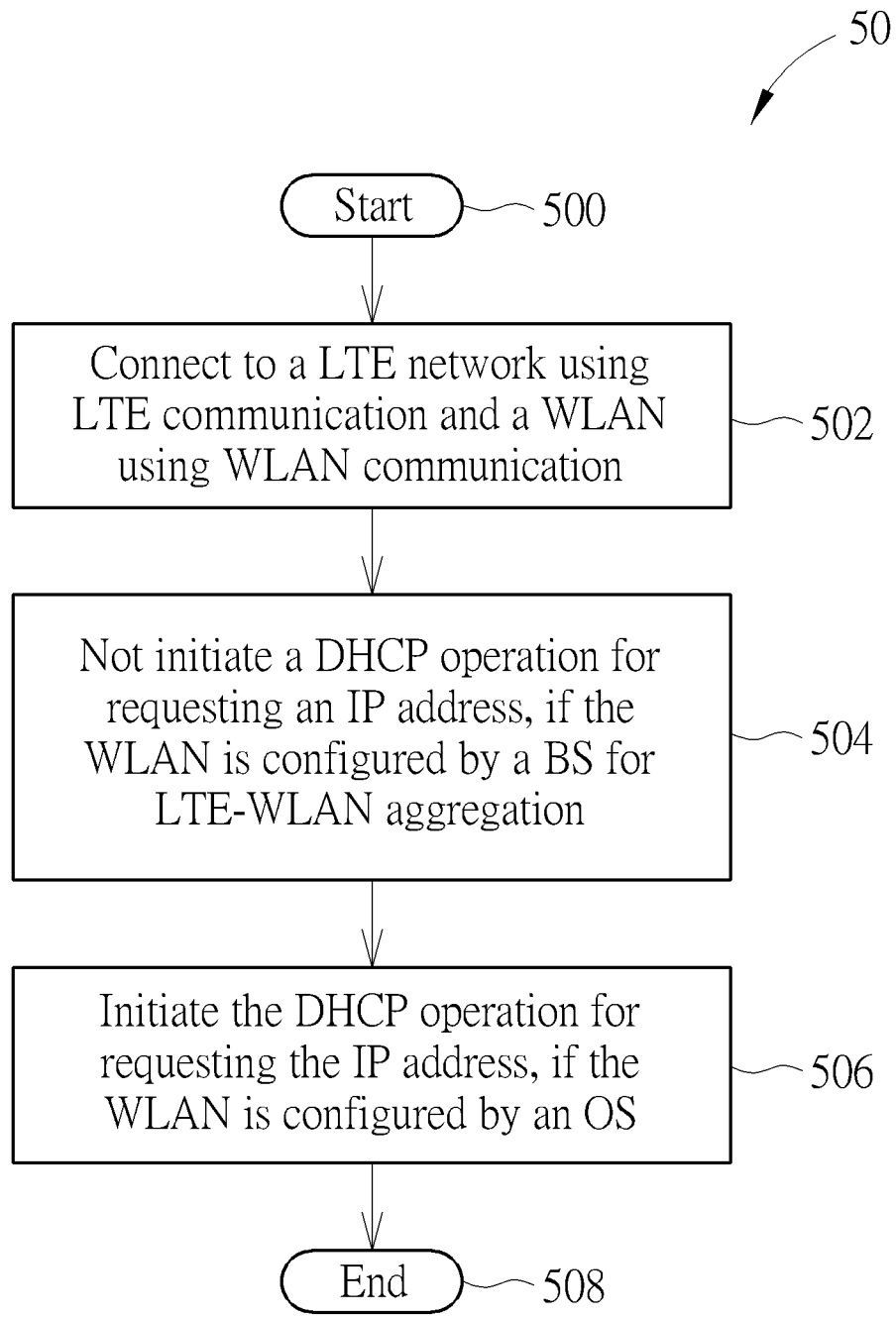
FIG. 5 is a flowchart of a process according to an example of the present invention.

FIG. 5 is a flowchart of a process 50 according to an example of the present invention. The process 50 may be utilized in a UE comprising an application side, a LTE modem and a WLAN modem, to perform LTE-WLAN aggregation. The process 50 includes the following steps:

Step 500: Start.

Step 502: Connect to a LTE network using LTE communication and a WLAN using WLAN communication.

Step 504: Not initiate a DHCP operation for requesting an IP address, if the WLAN is configured by a BS for LTE-WLAN aggregation.

Step 506: Initiate the DHCP operation for requesting the IP address, if the WLAN is configured by an OS.

Step 508: End.

According to the process 50, the UE connects to a LTE network using LTE communication and a WLAN (e.g., WiFi) using WLAN communication. Then, the UE does not initiate a DHCP operation for requesting an IP address, if the WLAN is configured by a BS for LTE-WLAN aggregation. The UE initiates the DHCP operation for requesting the IP address, if the WLAN is configured by an OS of the UE. That is, whether to initiate the DHCP operation for requesting the IP address for the WLAN is according to whether the LTE-WLAN aggregation is configured. Thus, UE transmits data of an application via a LTE modem of the UE instead of a WLAN modem of the UE since there is no IP address for the WLAN. The problem that the UE transmits the data via only the WLAN is solved. As a result, throughput of the UE is improved.

Realization of the process 50 is not limited to the above description.

In one example, the UE initiates the DHCP operation for requesting the IP address before the LTE-WLAN aggregation is configured. Then, the UE may drop the requested IP address after the DHCP operation, if the WLAN is configured by the BS for LTE-WLAN aggregation. In one example, the WLAN configured by the OS may be selected by a user or a selection application in the OS.

In one example, the UE transmits first data of the application to the LTE modem from an application side if the WLAN is configured by the BS for the LTE-WLAN aggregation, after connecting to the LTE network and the WLAN. Details of transmission of the first data are described in the process 40 and not repeated herein.

In one example, the UE transmits second data of the application to the WLAN modem from the application side, if the WLAN is configured by the OS. Details of transmission of the second data are described in the process 40 and not repeated herein.

In one example, the UE does not indicate to the application side by the LTE modem or the WLAN modem that the WLAN is connected for not triggering the application side to initiate the DHCP operation, if the WLAN is configured by the BS for the LTE-WLAN aggregation. Further, the UE indicates to the application side the LTE modem or the WLAN modem that the WLAN is connected for triggering the application side to initiate the DHCP operation, if the WLAN is configured by the OS.

Figure 6:
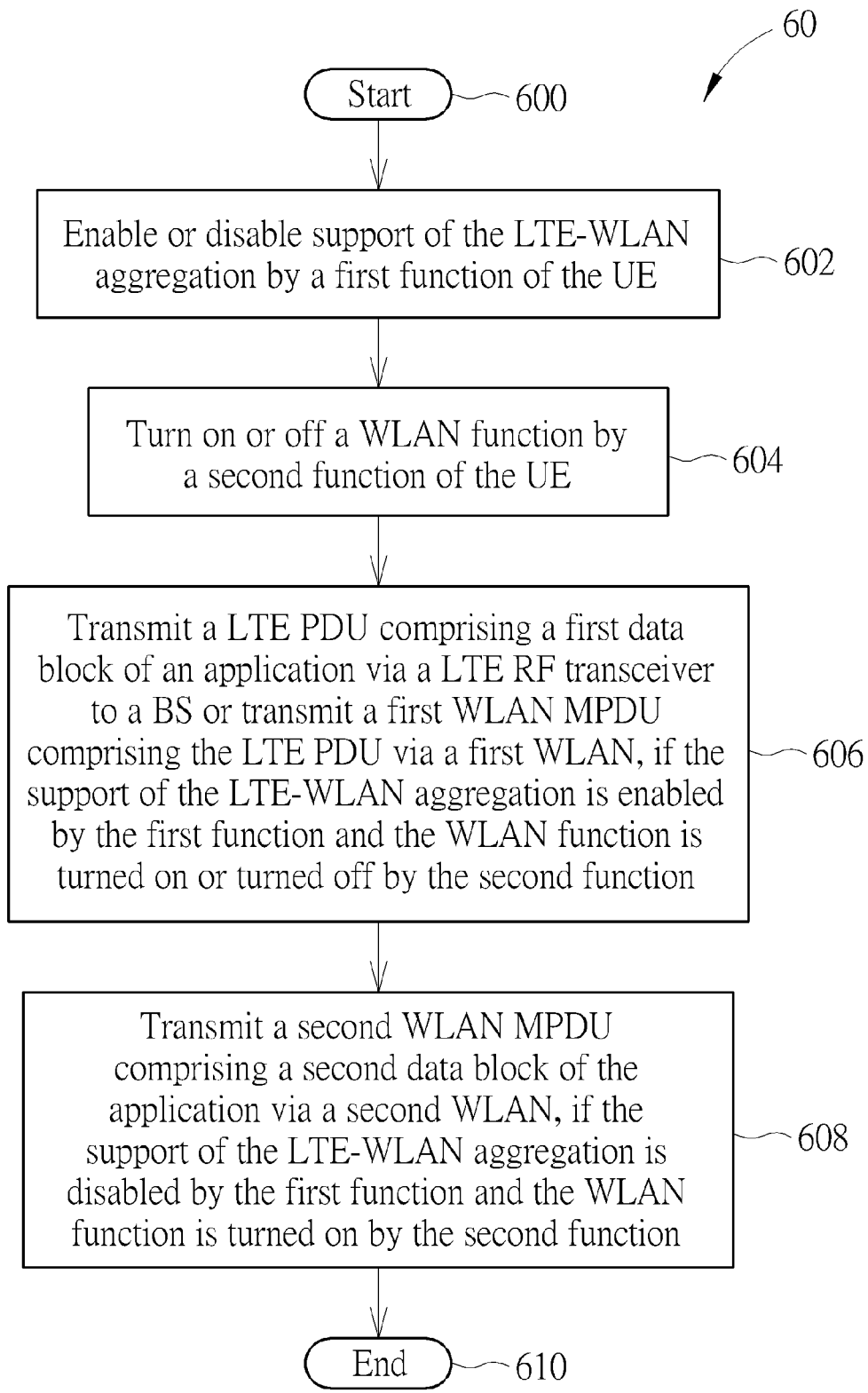
FIG. 6 is a flowchart of a process according to an example of the present invention.

FIG. 6 is a flowchart of a process 60 according to an example of the present invention. The process 60 may be utilized in a UE, to perform LTE-WLAN aggregation. The process 60 includes the following steps:

Step 600: Start.

Step 602: Enable or disable support of the LTE-WLAN aggregation by a first function of the UE.

Step 604: Turn on or off a WLAN function by a second function of the UE.

Step 606: Transmit a LTE PDU comprising a first data block of an application via a LTE RF transceiver to a BS or transmit a first WLAN MPDU comprising the LTE PDU via a first WLAN, if the support of the LTE-WLAN aggregation is enabled by the first function and the WLAN function is turned on or turned off by the second function.

Step 608: Transmit a second WLAN MPDU comprising a second data block of the application via a second WLAN, if the support of the LTE-WLAN aggregation is disabled by the first function and the WLAN function is turned on by the second function.

Step 610: End.

According to the process 60, the UE enables or disables the support of the LTE-WLAN aggregation by a first function of the UE. Then, the UE turns on or off a WLAN (e.g., WiFi) function by a second function of the UE. The UE transmits a LTE PDU comprising a first data block of an application via a LTE RF transceiver to a BS or transmits a first WLAN (e.g., IEEE 802.11) MPDU comprising the LTE PDU via a first WLAN, if the support of the LTE-WLAN aggregation is enabled by the first function and the WLAN function is turned on or turned off by the second function. Further, the UE transmits a second WLAN (e.g., IEEE 802.11) MPDU comprising a second data block of the application via a second WLAN, if the support of the LTE-WLAN aggregation is disabled by the first function and the WLAN function is turned on by the second function. That is, all packets of the application are traversed to the LTE, if the UE enables the support of the LTE-WLAN aggregation and the LTE-WLAN aggregation is configured by the BS. Thus, the problem that the UE transmits the data via only the WLAN is solved. As a result, throughput of the UE is improved.

Realization of the process 60 is not limited to the above description.

In one example, the LTE PDU is generated by a LTE modem of the UE, after the first data block is transmitted to the LTE modem by an application side. In one example, the first WLAN MPDU including the LTE PDU is generated by a WLAN modem of the UE, after the LTE PDU is transmitted to the WLAN modem by the LTE modem. In one example, the second WLAN MPDU including the second data block is generated by the WLAN modem of the UE, after the second data block is transmitted to the WLAN modem by the application side without building a LTE PDU to contain the second data block.

Figure 7:
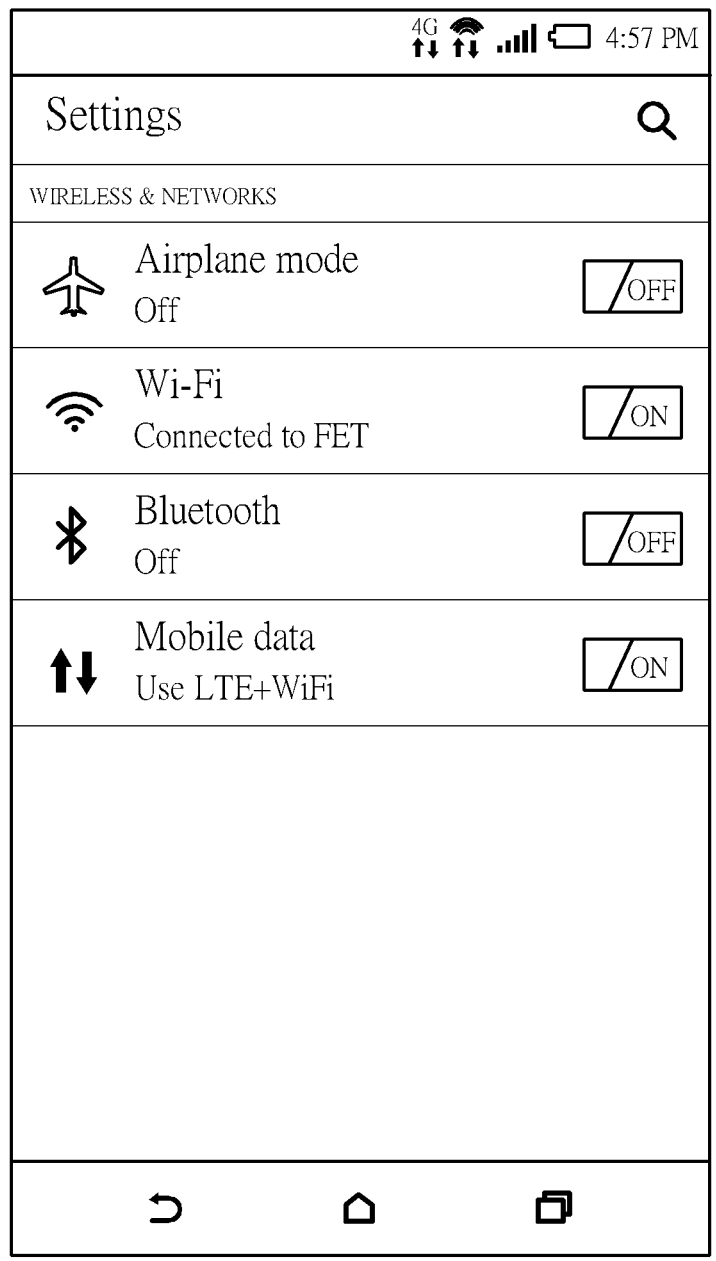
FIG. 7 is a schematic diagram of a menu of a communication device according to an example of the present invention.
Figure 8:
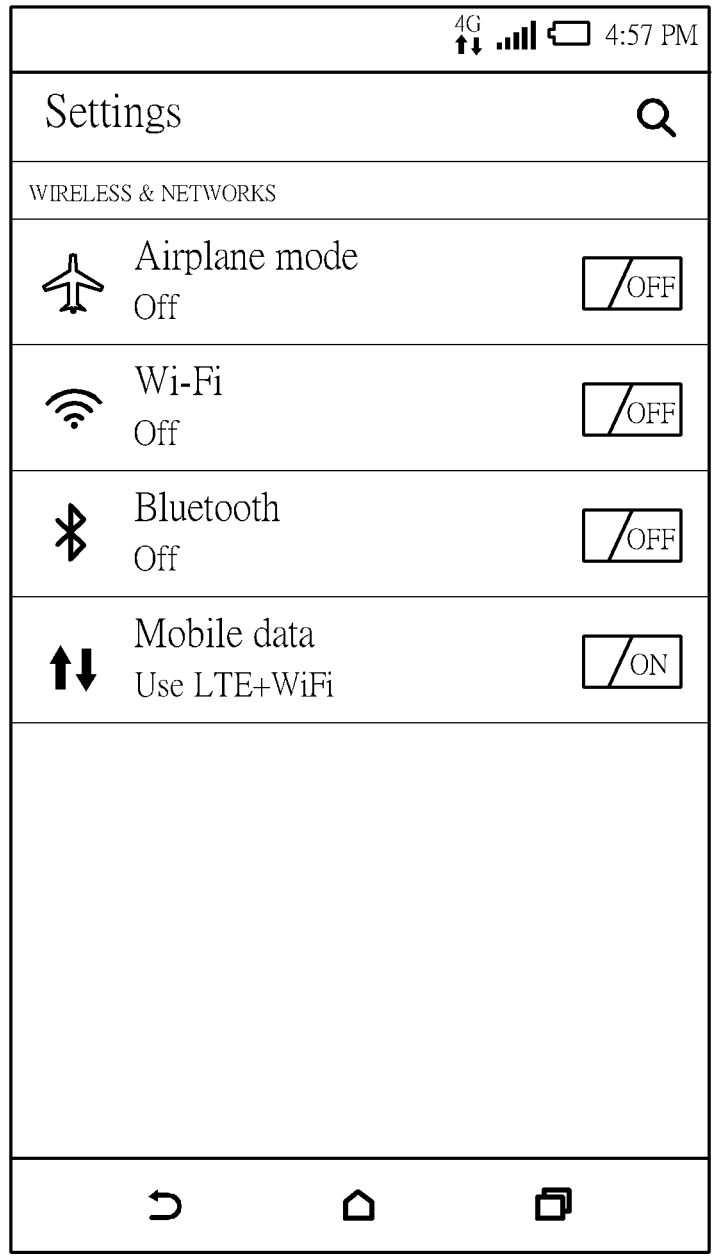
FIG. 8 is a schematic diagram of a menu of a communication device according to an example of the present invention.
Figure 9:
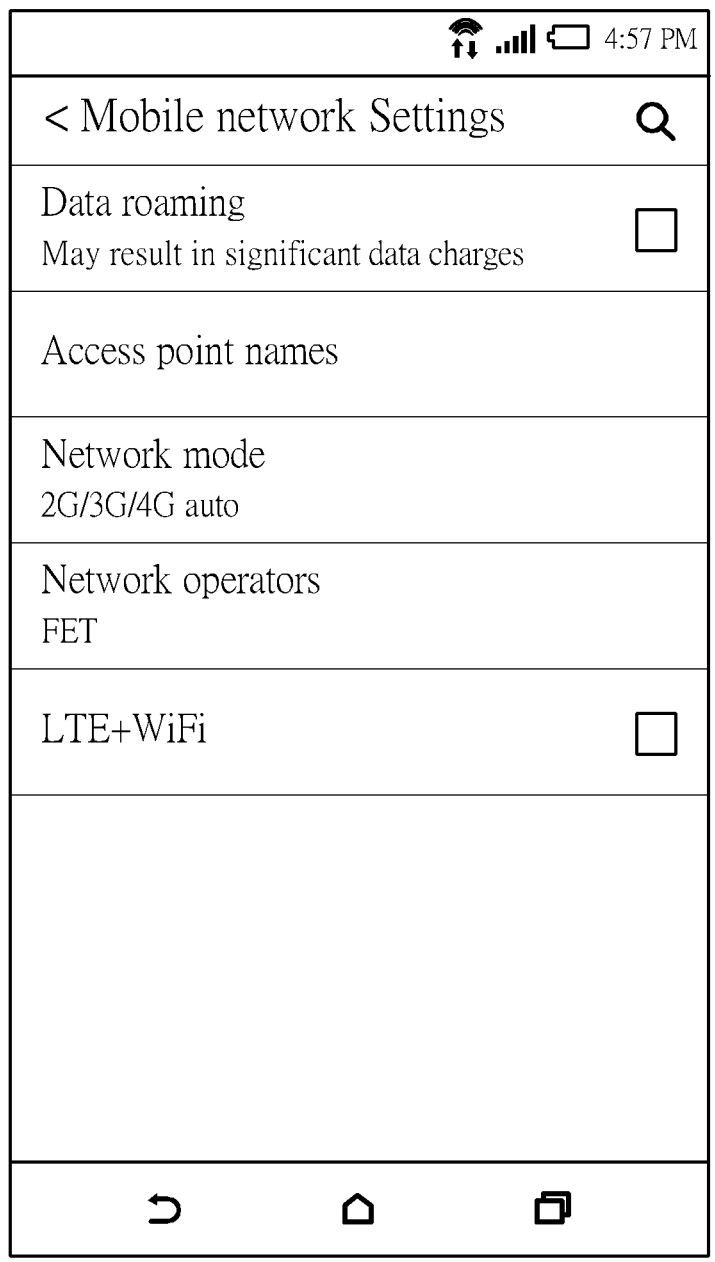
FIG. 9 is a schematic diagram of a menu of a communication device according to an example of the present invention.

The following example is used for illustrating the process 60. FIGS. 7-9 are schematic diagrams of a menu of a UE according to examples of the present invention. The first function may be an item "LTE+WiFi" in a menu of the UE shown in FIG. 9. The application side of the UE transmits a first data block of the application (e.g., web browsing, ftp, Facebook, YouTube, Gmail, Instagram) to the LTE modem, when the "LTE+WiFi" is triggered (e.g., enabled or turned on) and the "WiFi" is turned on (e.g., FIG. 7) or turned off (e.g., FIG. 8). Then, the LTE modem generates a LTE PDU including the first data block, which may include an IP packet. In one example, the UE may show 5G/4G/LTE and WiFi icons (e.g., status bar) on a screen, when the "LTE+WiFi" is triggered and the "WiFi" is turned on. In another example, the UE may show a 5G/4G/LTE icon on the screen but may or may not show the WiFi icon on the screen, when the "LTE+WiFi" is triggered and the "WiFi" is turned off. Whether the WiFi icon is shown on the screen is determined according to whether the user needs to know that the "WiFi" is turned on. In one example, the LTE modem transmits the LTE PDU to the WLAN modem directly or indirectly via the application side. The WLAN modem generates a first WLAN (e.g., IEEE 802.11) MPDU including the LTE PDU and may transmit the first WLAN MPDU to the first WLAN via a WLAN RF transceiver. In another example, the LTE modem transmits the LTE PDU via a LTE RF transceiver to a BS. The first function may be an item "LTE+WiFi" in a menu of the UE shown in FIG. 9. The application side of the UE may transmit a second data block of the application to the WLAN modem, when the "LTE+WiFi" is not triggered (e.g., disabled or turned off) and the "WiFi" is turned on (e.g., FIG. 9). The WLAN modem generates a second WLAN (e.g., IEEE 802.11) MPDU including the second data block and transmits the second WLAN MPDU to an AP of the second WLAN. That is, no LTE PDU is generated for the second data block. The first and second data blocks may include an IP packet. The second WLAN and the first WLAN may be the same or different. The first and the second WLAN may include at least one AP transmitting a same service set identifier (SSID), basic service set identifier (BSSID) or homogenous extended service set identifier (HESSID). In one example, the LTE PDU may be a LTE MAC PDU, a radio link control (RLC) PDU, packet data convergence protocol (PDCP) PDU or a newly defined PDU. The first WLAN and the second WLAN MPDU may be a single IEEE 802.11 MPDU or an aggregated MPDU (A-MPDU).

In one example, the UE establishes a radio resource control (RRC) connection with a BS via a LTE transceiver by a LTE modem. Further, the UE may transmit a first message (e.g., a LTE RRC message or a LTE PDU) indicating support of the LTE-WLAN aggregation to the BS via the LTE transceiver by the LTE modem, when the support of the LTE-WLAN aggregation is enabled by the first function. Further, the UE may receive a first configuration message (e.g., RRCConnectionReconfiguration) configuring the LTE-WLAN aggregation from the BS via the LTE transceiver by the LTE modem, after transmitting the first message. In one example, the first configuration message may configure the UE to use the first WLAN for the LTE-WLAN aggregation. In one example, the transmission of the first message is indicated by the application side of the UE. In one example, enabling of the support of the LTE-WLAN aggregation is indicated to the LTE modem by the application side.

In one example, a WLAN configuration in the first configuration message includes an identity for identifying the first WLAN. In one example, the identity may be a SSID, a BSSID and/or a HESSID.

In one example, the UE transmits a second message (e.g., a LTE RRC message or a LTE MPDU) indicating that the LTE-WLAN aggregation is not supported or the WLAN is off to the BS via the LTE transceiver by the LTE modem, when the LTE-WLAN aggregation is disabled by the first function or the WLAN function is turned off by the second function. Further, the UE may receive a second configuration message (e.g., RRCConnectionReconfiguration) releasing the LTE-WLAN aggregation from the BS via the LTE by the LTE modem, after transmitting the second message. In one example, the second configuration message may configure the UE not to use the first WLAN for the LTE-WLAN aggregation. In one example, the transmission of the second message is indicated by the application side of the UE. In one example, disabling of the support of the LTE-WLAN aggregation is indicated to the LTE modem by the application side.

In one example, the first data block may be a first IP packet including a source IP address received in an ACTIVATE DEFAULT EPS BEARER CONTEXT REQUEST message from the LTE network.

In one example, the UE initiates a DHCP operation for requesting an IP address by an application side, when the support of the LTE-WLAN aggregation is disabled by the first function and the WLAN function is turned on by the second function. In one example, the second data block is a second IP packet including a source IP address set to the IP address. In another example, the UE does not initiate a DHCP operation for requesting an IP address by an application side, when the LTE-WLAN aggregation is enabled by the first function and the WLAN function is turned off by the second function.

Figure 10:
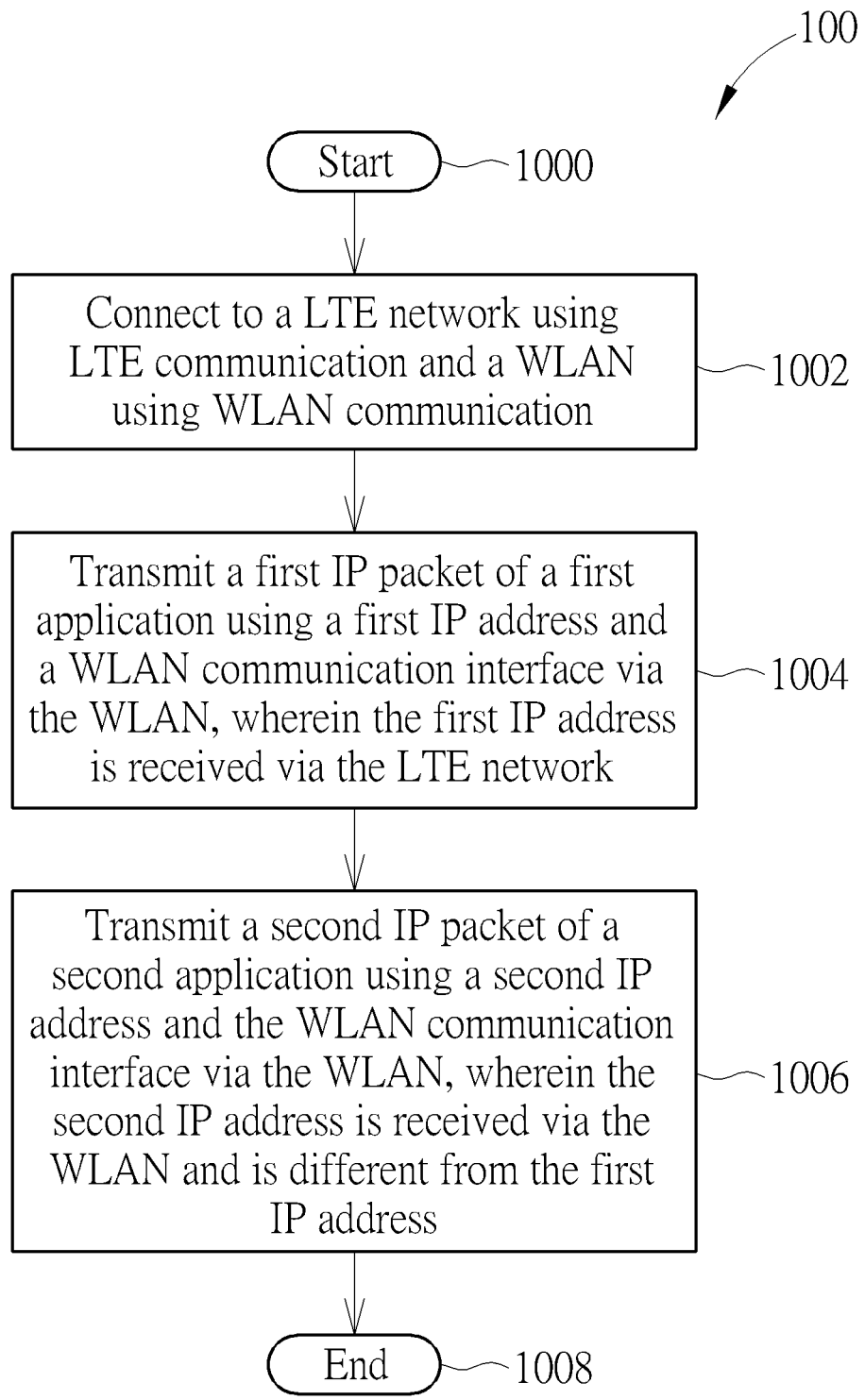
FIG. 10 is a flowchart of a process according to an example of the present invention.

FIG. 10 is a flowchart of a process 100 according to an example of the present invention. The process 100 may be utilized in a UE, to perform LTE-WLAN aggregation. The process 100 includes the following steps:

Step 1000: Start.

Step 1002: Connect to a LTE network using LTE communication and a WLAN using WLAN communication.

Step 1004: Transmit a first IP packet of a first application using a first IP address and a WLAN communication interface via the WLAN, wherein the first IP address is received via the LTE network.

Step 1006: Transmit a second IP packet of a second application using a second IP address and the WLAN communication interface via the WLAN, wherein the second IP address is received via the WLAN and is different from the first IP address.

Step 1008: End.

According to the process 100, the UE connects to a LTE network using LTE communication and a WLAN using the WLAN communication. Then, the UE transmits a first IP packet of a first application using a first IP address and a WLAN (e.g., WiFi) communication interface via the WLAN, wherein the first IP address is received via (e.g., from) the LTE network. In addition, the UE transmits a second IP packet of a second application using a second IP address and the WLAN communication interface via the WLAN, wherein the second IP address is received via (e.g., from) the WLAN and is different from the first IP address. That is, the UE is configured with the first IP address and the second IP address. The UE is configured to transmit the first IP packet of the first application by setting a source IP address of the first IP packet to the first IP address, and transmits the second IP packet of the second application by setting a source IP address of the second IP packet to the second IP address. In other words, not all packets of all applications are traversed to the LTE network using the LTE communication when the LTE-WLAN aggregation is configured. The UE is still allowed to communicate non-LTE packets (e.g. IMS voice packets) via the WLAN when the UE is configured the LTE-WLAN aggregation. Thus, the problem that the unnecessary latency for transmission of the IMS voice packets when the UE is configured the LTE-WLAN aggregation is solved.

Realization of the process 100 is not limited to the above description.

In one example, the first application may be a web browser, YouTube, Facebook, Twitter, Gmail or Instagram. The second application may be an IP multimedia subsystem (IMS) voice application (e.g., IMS voice over WLAN) or IMS video application (e.g., IMS video over WLAN).

In one example, the UE generates a LTE PDU including the first IP packet, and generates a first WLAN (e.g., IEEE 802.11) MPDU including the LTE PDU. Further, the UE transmits the first WLAN MPDU via the WLAN via the WLAN communication interface. In one example, the UE generates a second WLAN MPDU including the second IP packet, and may transmit the second WLAN MPDU via the WLAN. In one example, the LTE PDU may be a LTE MAC PDU, a RLC PDU, PDCP PDU or a newly defined PDU. The first WLAN (e.g., IEEE 802.11) and the second WLAN MPDU may be a single IEEE 802.11 MPDU or an A-MPDU. It should be noted that an LTE PDU including the second IP packet is not generated.

In one example, the UE may initiate a DHCP operation for requesting the second IP address via the WLAN.

In one example, the UE transmits a third IP packet of the first application using the first IP address and the LTE communication interface (e.g., a LTE transceiver or a LTE modem) to the LTE network.

In one example, the UE transmits the first IP packet of the first application to a LTE modem from an application side, and generates a LTE PDU including the first IP packet by the LTE modem. Further, the UE transmits the LTE PDU to the WLAN modem by the LTE modem, and generates a first WLAN MPDU including the LTE PDU by the WLAN modem. Further, the UE transmits the first WLAN MPDU to the WLAN by the WLAN modem. In one example, the UE sends the second IP packet of the second application to the WLAN modem by the application side and generates a second WLAN MPDU including the second IP packet by the WLAN modem.

In one example, the first IP packet is encrypted by the LTE modem and the second IP packet is encrypted by an IP security (IPSec) or the WLAN modem.

In one example, the UE receives a fourth IP packet of the first application using the first IP address and the WLAN communication interface via (e.g., from) the WLAN. In one example, the first IP address is received from (e.g., from) the LTE network, and receives a fifth IP packet of the second application using the second IP address and the WLAN communication interface via (e.g., from) the WLAN. In one example, the second IP address is received from the WLAN and is different via the first IP address.

In an example of the DHCP operation in any process above, the UE initiates the DHCP operation by transmitting a "DHCP DISCOVERY" to the WLAN. A DHCP server may receive the "DHCP DISCOVERY" from the WLAN and may transmit a "DHCP OFFER" including an IP address configured to the UE to the WLAN. It should be noted that the DHCP service may be collocated or not collocated with an AP of the WLAN. If not collocated, the DHCP server may or may not connect to the AP of the WLAN directly.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for handling the LTE-WLAN aggregation. Thus, the problem that the UE transmits the data via only the WLAN is solved. The problem that the unnecessary latency for transmission of the IMS voice packets when the UE is configured the LTE-WLAN aggregation is also solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device comprising of an application side, a long term evolution (LTE) modem and a wireless local area network (WLAN) modem, comprising:
   a storage unit for storing instructions of:
   connecting to a LTE network using LTE communication and a WLAN using WLAN communication;
   transmitting first data of an application to the LTE modem from the application side if the WLAN is configured by a base station (BS) of the LTE network for LTE-WLAN aggregation, after connecting to the LTE network and the WLAN; and
   transmitting second data of the application to the WLAN modem from the application side if the WLAN is not configured by the BS for the LTE-WLAN aggregation, after connecting to the LTE and the WLAN; and
   a processing means, coupled to the storage unit, configured to execute the instructions stored in the storage unit.

2. The communication device of claim 1, wherein the WLAN is configured by the BS for the LTE-WLAN aggregation according to following instructions:
   transmitting a first message indicating support of the LTE-WLAN aggregation to the BS via the LTE;
   receiving a configuration message configuring a transmission or a reception of at least one LTE packet data convergence protocol (PDCP) packet via the WLAN and a WLAN configuration from the BS via the LTE; and
   connecting to the WLAN configured by the WLAN configuration.

3. The communication device of claim 1, wherein the WLAN is selected by the application side, when the WLAN is not configured by the BS for the LTE-WLAN aggregation.

4. The communication device of claim 1, wherein the instruction of transmitting the first data of the application to the LTE modem from the application side comprises:
   transmitting a first plurality of IP packets to the LTE modem from the application side, wherein the first data includes the first plurality of IP packets;
   encapsulating the first plurality of IP packets into a plurality of LTE protocol data units (PDUs) by the LTE modem;
   transmitting part or all of a first plurality of LTE PDUs to the WLAN modem via the application side by the LTE modem;
   encapsulating the first plurality of LTE PDUs into at least one WLAN media access control (MAC) PDU (MPDU); and
   transmitting the at least one WLAN MPDU via the WLAN by the WLAN modem.

5. The communication device of claim 1, wherein the instruction of transmitting the second data of the application to the WLAN modem from the application side comprises:
   transmitting a second plurality of IP packets to the WLAN modem from the application side, wherein the second data includes the second plurality of IP packets;
   encapsulating the second plurality of IP packets into at least one WLAN MPDU; and
   transmitting the at least one WLAN MPDU via the WLAN by the WLAN modem.

6. The communication device of claim 4, wherein the storage unit further stores an instruction of:
   receiving a first IP address via the LTE and a second IP address via the WLAN, wherein a source IP address in each of the first plurality of IP packets is set to the first IP address.

7. The communication device of claim 5, wherein the storage unit further stores instructions of:
   receiving a second IP address via the WLAN;
   wherein a source IP address in each of the second plurality of IP packets is set to the second IP address.

8. A communication device comprising an application side, a longterm evolution (LTE) modem and a wireless local area network (WLAN) modem, comprising:
   a storage unit for storing instructions of:
   connecting to a LTE network using LTE communication and a WLAN using WLAN communication;
   not initiating a dynamic host configuration protocol (DHCP) operation for requesting an internet protocol (IP) address, if the WLAN is configured by a base station (BS) for LTE-WLAN aggregation; and
initiating the DHCP operation for requesting the IP address, if the WLAN is configured by an operation system (OS); and
a processing means, coupled to the storage unit, configured to execute the instructions stored in the storage unit.

9. The communication device of claim 8, wherein the storage unit further stores instructions of:
not indicating to the application side by the LTE modem or the WLAN modem that the WLAN is connected for not triggering the application side to initiate the DHCP operation, if the WLAN is configured by the BS for the LTE-WLAN aggregation; and
indicating to the application side by the LTE modem or the WLAN modem that the WLAN is connected for triggering the application side to initiate the DHCP operation, if the WLAN is configured by the OS.

10. A communication device of handling long term evolution (LTE)-wireless local area network (WLAN) aggregation, comprising:
a storage unit for storing instructions of:
enabling or disabling support of the LTE-WLAN aggregation by a first function of the communication device;
turning on or off a WLAN function by a second function of the communication device;
transmitting a LTE protocol data unit (PDU) comprising a first data block of an application via a LTE radio frequency (RF) transceiver to a base station (BS) or transmit a first WLAN MAC PDU (MPDU) comprising the LTE PDU via a first WLAN, if the support of the LTE-WLAN aggregation is enabled by the first function and the WLAN function is turned on or turned off by the second function; and
transmitting a second WLAN MPDU comprising a second data block of the application via a second WLAN, if the support of the LTE-WLAN aggregation is disabled by the first function and the WLAN function is turned on by the second function; and
a processing means, coupled to the storage unit, configured to execute the instructions stored in the storage unit.

11. The communication device of claim 10, wherein the storage unit further stores instructions of:
establishing a radio resource control (RRC) connection with the BS via a LTE transceiver by a LTE modem;
transmitting a first message indicating support of the LTE-WLAN aggregation to the BS via the LTE by the LTE modem, when the support of the LTE-WLAN aggregation is enabled by the first function; and
receiving a first configuration message configuring the LTE-WLAN aggregation from the BS via the LTE by the LTE modem, after transmitting the first message, wherein the first configuration message configuring the communication device to use the first WLAN for the LTE-WLAN aggregation.

12. The communication device of claim 10, wherein the storage unit further stores instructions of:
transmitting a second message indicating that the LTE-WLAN aggregation is not supported or the WLAN is off to the BS via the LTE transceiver by the LTE modem, when the support of the LTE-WLAN aggregation is disabled by the first function or the WLAN function is turned off by the second function; and
receiving a second configuration message releasing the LTE-WLAN aggregation from the BS via the LTE by the LTE modem, after transmitting the second message.

13. The communication device of claim 10, wherein the first data block is a first internet protocol (IP) packet comprising a source IP address received in an ACTIVATE DEFAULT EPS BEARER CONTEXT REQUEST message from the LTE network; and the communication device initiates a dynamic host configuration protocol (DHCP) operation for requesting an IP address by an application side, when the LTE-WLAN aggregation is disabled by the first function and the WLAN function is turned on by the second function, wherein the second data block is a second IP packet comprising a source IP address for setting the IP address.

14. A communication device for handling long term evolution (LTE)-wireless local area network (WLAN) aggregation, comprising:
a storage unit for storing instructions of:
connecting to a LTE network using LTE communication and a WLAN using WLAN communication;
transmitting a first internet protocol (IP) packet of a first application using a first IP address and a WLAN communication interface via the WLAN, wherein the first IP address is received via the LTE network; and
transmitting a second IP packet of a second application using a second IP address and the WLAN communication interface via the WLAN, wherein the second IP address is received via the WLAN and is different from the first IP address; and
a processing means, coupled to the storage unit, configured to execute the instructions stored in the storage unit.

15. The communication device of claim 14, wherein the instruction of transmitting the first IP packet of the first application using the first IP address and the WLAN communication interface via the WLAN comprises:
generating a LTE protocol data unit (PDU) comprising the first IP packet;
generating a first WLAN MAC PDU (MPDU) comprising the LTE PDU;
transmitting the first WLAN MPDU via the WLAN via the WLAN communication interface;
generating a second WLAN MPDU comprising the second IP packet; and
transmitting the second WLAN MPDU via the WLAN.

16. The communication device of claim 14, wherein the first IP address is received in an ACTIVATE DEFAULT EPS BEARER CONTEXT REQUEST message via the LTE; and
initiating a dynamic host configuration protocol (DHCP) operation for requesting the second IP address via the WLAN.

17. The communication device of claim 14, wherein the instruction of transmitting the first IP packet of the first application using the first IP address and the WLAN communication interface via the WLAN comprises:
transmitting the first IP packet of the first application to a LTE modem from an application side;
generating a LTE PDU comprising the first IP packet by the LTE modem;
transmitting the LTE PDU to the WLAN modem by the LTE modem;
generating a first WLAN MPDU including the LTE PDU by the WLAN modem;
transmitting the first WLAN MPDU to the WLAN modem by the WLAN modem;

generating a second WLAN MPDU including the second IP packet; and transmitting the second IP packet of the second application to the WLAN modem by the application side.

18. The communication device of claim 14, wherein the storage unit further stores instructions of:

receiving a fourth IP packet of the first application using the first IP address and the WLAN communication interface via the WLAN, wherein the first IP address is received via the LTE; and receiving a fifth IP packet of the second application using the second IP address and the WLAN communication interface via the WLAN, wherein the second IP address is received via the WLAN and is different via the first IP address.

* * * * *